United States Patent
Aizawa

(10) Patent No.: US 8,238,272 B2
(45) Date of Patent: *Aug. 7, 2012

(54) FREQUENCY DIVISION MULTIPLEX TRANSMISSION SIGNAL RECEIVING APPARATUS

(75) Inventor: Masami Aizawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 270 days.

This patent is subject to a terminal disclaimer.

(21) Appl. No.: 12/683,034

(22) Filed: Jan. 6, 2010

(65) Prior Publication Data

US 2010/0189133 A1 Jul. 29, 2010

(30) Foreign Application Priority Data

Jan. 26, 2009 (JP) ................................. 2009-014601

(51) Int. Cl.
*H04J 1/00* (2006.01)
(52) U.S. Cl. ........................................ 370/281; 370/319
(58) Field of Classification Search .................. 370/281, 370/295, 319, 208, 203, 344
See application file for complete search history.

(56) References Cited

U.S. PATENT DOCUMENTS 7,043,680 B2 * 5/2006 Aizawa .......................... 714/776
7,313,086 B2 12/2007 Aizawa

FOREIGN PATENT DOCUMENTS

JP 2002-118533 4/2002

* cited by examiner

*Primary Examiner* — Brenda H Pham
(74) *Attorney, Agent, or Firm* — Turocy & Watson, LLP

(57) ABSTRACT

A frequency division multiplex transmission signal receiving apparatus for receiving a frequency division multiplex transmission signal using a plurality of carries includes: an estimation section estimating a transfer function of a received signal after the received signal has been transformed into a frequency domain signal; a demodulation section demodulating the received signal according to the transfer function estimated by the estimation section; a plurality of variation detecting sections performing variation detection using a plurality of different variation detection methods, based on the transfer function estimated by the estimation section; a reliability determining section determining reliability based on a result of a combination of variation detection results of the plurality of variation detecting sections; and a correction section performing error correction of the demodulated signal from the demodulation section, the demodulated signal being subjected to an application of a reliability determination result of the reliability determining section.

12 Claims, 4 Drawing Sheets

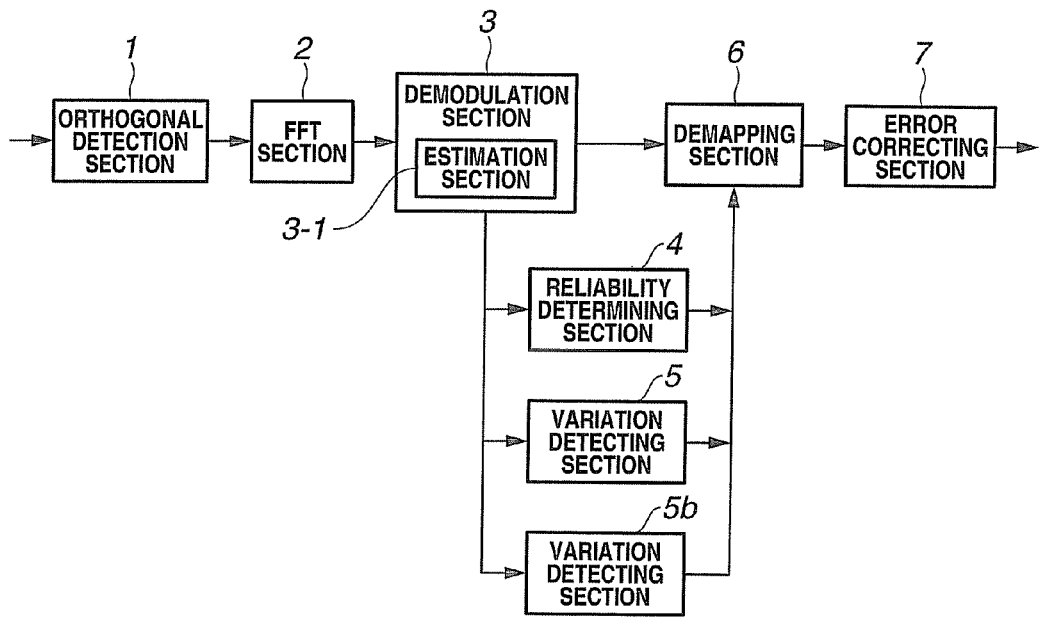
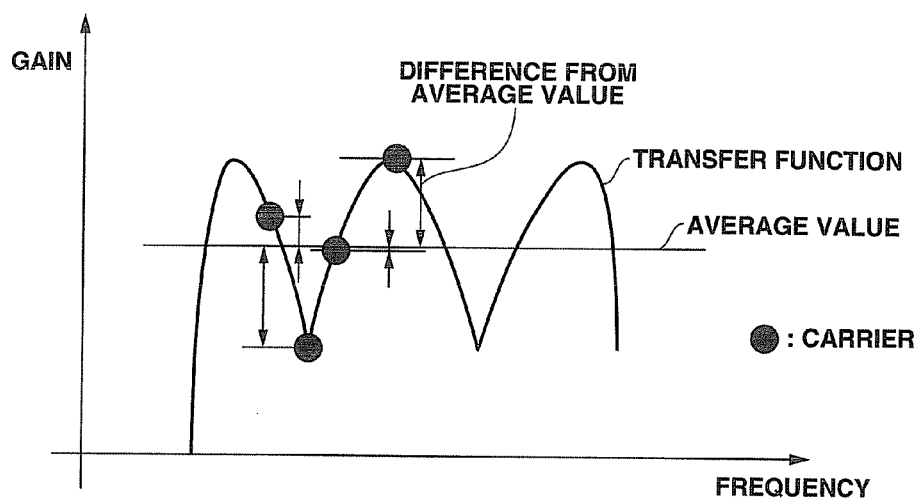

FREQUENCY DIVISION MULTIPLEX TRANSMISSION SIGNAL RECEIVING APPARATUS

CROSS-REFERENCE TO RELATED APPLICATION

This application is based upon and claims the benefit of priority from the prior Japanese Patent Application No. 2009-014601 filed in Japan on Jan. 26, 2009; the entire contents of which are incorporated herein by reference.

BACKGROUND OF THE INVENTION

1. Field of the Invention

The present invention relates to a frequency division multiplex transmission signal receiving apparatus, and specifically relates to an improvement of a reception technique where multipath, fading or the like occurs in received signals, deteriorating the demodulation capability.

2. Description of Related Art

In recent years, digital transmission of audio and video signals has actively been developed, and OFDM has been employed in the broadcasting and telecommunications field as an optimum system. In OFDM, data is allocated to a plurality of carriers that are orthogonal to each other, modulated and demodulated. On the sender side, IFFT (Inverse Fast Fourier Transform) is performed, and on the receiver side, FFT (Fast Fourier Transform) is performed.

For each carrier, an arbitrary modulation method can be used, and QAM transmission using synchronous detection or transmission using delay detection can be employed. In synchronous detection, a pilot signal is periodically inserted, and on the receiver side, a deviation from the pilot signal is obtained to perform amplitude and phase equalization.

Alternatively, differential encoding is performed between symbols, and received signals are demodulated by means of delay detection, without being subjected to carrier reproduction.

In digital transmission, error correction is essential from the perspective of deterioration caused by transmission paths, and transmission characteristic enhancement.

Methods have been proposed (see, for example, Japanese Patent No. 3872950) responding to the case where although Gaussian noise-optimized Viterbi decoding is performed, noise distribution is different from the Gaussian distribution because of the existence of a fading transmission path, which causes sharp time variations, and reflected waves called multipath, resulting in impossibility to provide sufficient performance.

However, only with individual parameters such as frequency variation and time variation, which are used in Japanese Patent No. 3872950, optimum correction adapted to differences arising from complex reception conditions cannot be made.

BRIEF SUMMARY OF THE INVENTION

A frequency division multiplex transmission signal receiving apparatus according to the present invention is the frequency division multiplex transmission signal receiving apparatus for receiving a frequency division multiplex transmission signal using a plurality of carriers, which includes: an estimation section configured to estimate a transfer function of a received signal after the received signal has been transformed into a frequency domain signal; a demodulation section configured to demodulate the received signal according to the transfer function estimated by the estimation section; a plurality of variation detecting sections configured to perform variation detection using a plurality of different variation detection methods, based on the transfer function estimated by the estimation section; a reliability determining section configured to determine reliability based on a result of a combination of variation detection results of the plurality of variation detecting sections; and a correction section configured to perform error correction of the demodulated signal from the demodulation section, the modulated signal being subjected to an application of a reliability determination result of the reliability determining section.

BRIEF DESCRIPTION OF THE DRAWINGS

FIG. 1 is a block diagram illustrating a frequency division multiplex transmission signal receiving apparatus according to an embodiment of the present invention;

FIG. 2 is an explanatory diagram illustrating an example of a method for detection in a variation detecting section;

FIG. 3A is a diagram illustrating the case of a closely-spaced multipath; and FIG. 3B is a diagram illustrating the case of a long delay multipath;

DETAILED DESCRIPTION OF THE INVENTION

Figure 3A:
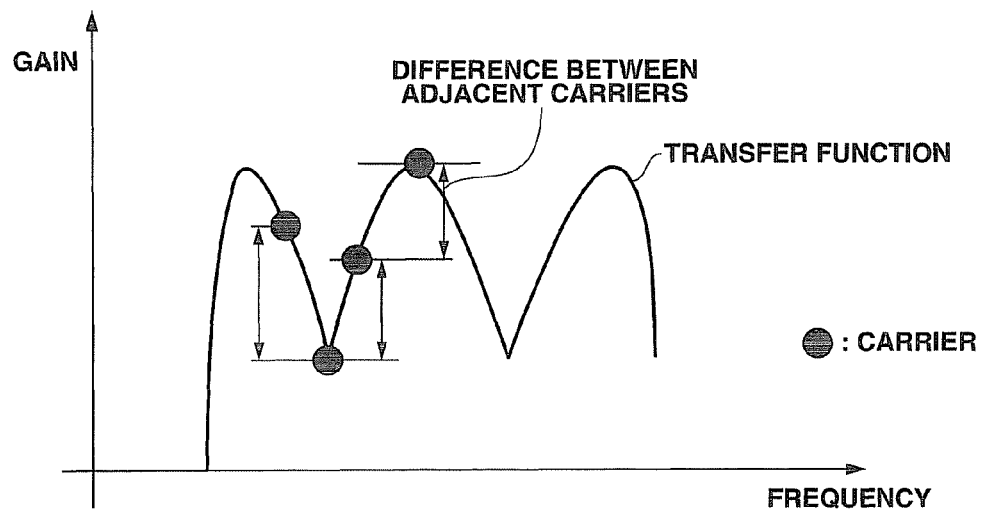
FIGS. 3A and 3B are explanatory diagrams illustrating another example of a method for detection in a variation detecting section.

Hereinafter, an embodiment of the present invention will be described in details with reference to the drawings. An OFDM receiving apparatus will be described as a frequency division multiplex transmission signal receiving apparatus according to an embodiment of the present invention.

The OFDM receiving apparatus according to the present embodiment is a technique for checking frequency variation in a certain transmission condition, such as multipath or fading, in terrestrial transmission, to detect the frequency variation, and applying the frequency variation to error correction, thereby enhancing the performance.

FIG. 1 is a block diagram of a main part of an OFDM receiving apparatus according to an embodiment of the present invention.

In FIG. 1, an OFDM signal received by an antenna (not illustrated) or an OFDM signal transmitted through a cable is tuned by a tuner (not illustrated), and converted into a digital signal by an A/D conversion circuit. The received and A/D-converted digital signal is subjected to semi-synchronous orthogonal detection in an orthogonal detection section 1 to be transformed into a baseband signal, and supplied to a FFT (Fast Fourier Transform) section 2. The FFT section 2 transforms the input time-domain signal into a frequency-domain signal. The FFT output, which has been transformed into a frequency domain signal by the FFT section 2, indicates the phase and amplitude of each carrier in the OFDM signal. The FFT output from the FFT section 2 is supplied to a demodulation section 3.

The demodulation section 3 includes an estimation section 3-1 configured to estimate the transfer function of the received signal after being transformed into a frequency domain signal, and demodulates the received signal according to the transfer function estimated by the estimation section 3-1.

In the demodulation section 3, a transfer function, which is a transmission characteristic, is estimated, and synchronous detection or delay detection is performed. In other words, the demodulation section 3 estimates the transfer function FFT for each carrier of the FFT output obtained by the FFT section 2, and demodulates the FFT output by means of a demodulation method according to the estimated transfer function, for example, synchronous detection or delay detection, to generate a demodulated signal.

In the case of synchronous detection, a pilot signal (pilot carrier), which is a reference signal, is periodically inserted in the frequency direction and the time direction on the sender side, and this pilot signal is extracted and compared with a reference value to perform amplitude and phase equalization.

Here, a transmitted signal and a received signal are each represented by a function of a frequency f and time t, and where the transmitted signal is X(f, t) and the received signal is R(f, t), the following relationship can be established between X and R.

$$R(f,t) = H(f,t) \cdot X(f,t) + N \quad (1)$$

In Equation (1), H(f, t) is referred to as a transfer function in a transmission path. Also, N is additive interference, for example, thermal noise.

Where a transmitted signal for a pilot signal, which is known, is X'(f, t), a received signal for the pilot signal is R'(f,t), and thermal noise N is ignored, the transfer function H(f, t) can be obtained by the following equation:

$$H(f,t) = R'(f,t)/X'(f,t) \quad (2)$$

In other words, estimation of a transfer function corresponds to obtaining a transmission function H(f, t) based on Equation (2).

In the case of delay detection, detection can be performed without performing carrier reproduction, by means of performing a complex operation using two consecutive symbols, no pilot signals are required as opposed to synchronous detection, and equalization is not required, either.

The data equalized by means of synchronous detection or data subjected to delay detection (demodulated signal) is supplied to a reliability determining section 4, a variation detecting section 5, another variation detecting section 5b and a demapping section 6.

The reliability determining section 4 determines the reliability from the estimated transfer function for each carrier, and more specifically, calculates a weighting coefficient from the transfer function. In other words, the magnitude of each transfer function H(f, t) estimated as described above varies depending on the transmission path, and if the transfer function H(f, t) is large, the reliability of the demodulated signal is high, while if the transfer function H(f, t) is small, the reliability is low. Accordingly, the reliability determining section 4 calculates a weighting coefficient proportional to the magnitude of the transfer function H(f, t). A signal according to the weighting coefficient is supplied to the demapping section 6.

The variation detecting section 5 detects frequency or time variation, and quantifies the degree of the variation. In other words, the variation detecting section 5, for example, detects frequency or time variation of the transfer function H(f,t), and quantifies the degree of the variation. Furthermore, the other different variation detecting section 5b detects frequency and time variation with a method that is different from that of the variation detecting section 5, and quantifies the degree of the variation. The quantified signals from the variation detecting sections 5 and 5b are supplied to the demapping section 6.

The demapping section 6 provides signal weighting after demapping to the equalized output from the demodulation section 3, based on the weighting coefficient of the received signal from the reliability determining section 4 and the numerical values indicating the degrees of variation from the variation detecting sections 5 and 5b (hereinafter referred to as "variation value(s)"), or selects a different demapping method and sends the output to an error correcting section 7. In a broader sense, the demapping section 6 can be considered having a part of the function of the reliability determining section 4.

The demapping section 6 calculates a BM (branch metric) required for Viterbi decoding from the demodulated signal from the demodulation section 3, and more specifically, measures Euclidean distances on the IQ axes from respective representative symbols such as quarternary and hexadecimal symbols to the received symbol.

When demodulation is performed, the received signal is multiplied by a sine-wave component, and the received signal is also multiplied by a cosine-wave component, and then, respective absolute values for the received signal are obtained from the multiplication results. An absolute value signal obtained as a result of multiplication by a cosine-wave component is referred to as an I signal, and an absolute value signal obtained as a result of multiplication by a sine-wave component is referred to as a Q signal. Furthermore, one obtained by plotting (demapping) the I and Q signals on I-Q orthogonal axes (I-Q axes) is referred to as a constellation.

The error correcting section 7 performs error correction of the weighted signal and outputs the signal.

Next, a detection method in each of the variation detecting sections 5 and 5b will be described with reference to FIGS. 2 to 4.

Figure 3B:
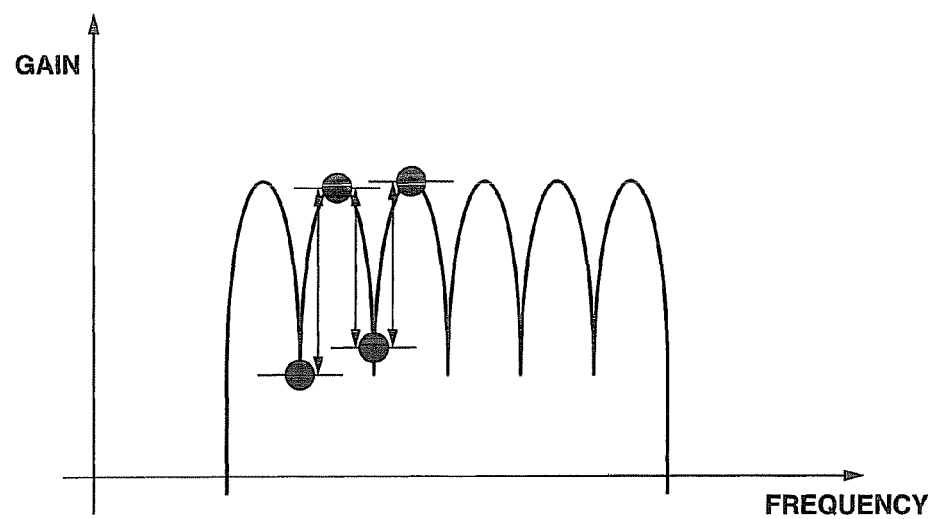
Figure 4:
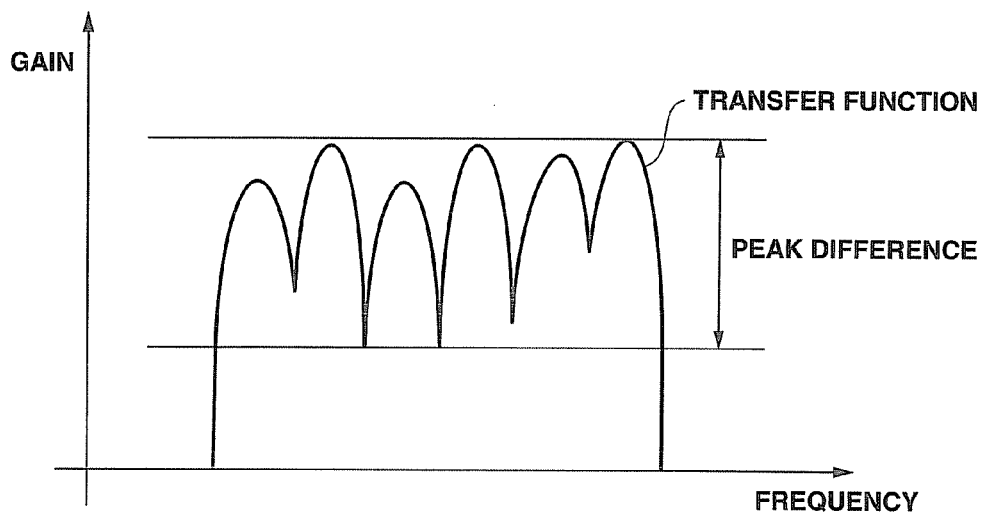
FIG. 4 is an explanatory diagram illustrating still another example of a method for detection in a variation detecting section.

FIGS. 2 to 4 each illustrate a frequency spectrum where an OFDM signal suffers multipath interference. An OFDM signal suffering multipath interference causes a dip (drop in gain) at regular frequency intervals.

FIG. 2 illustrates an example of a method for detecting a variation value fvar in the variation detecting section 5. The horizontal axis represents frequency, and the vertical axis represents gain.

In order to obtain transfer function variation, each of the variation detecting sections 5 and 5b receives the transfer function estimated by the demodulation section 3 or a signal similar to the transfer function, and obtain a sum of the absolute values of differences from an average value of the signal. In this case, what is obtained is not limited to an absolute value sum, and a square sum, etc., may be employed. The differences indicated by the arrows in FIG. 2 are integrated on the frequency axis to calculate the amount of variation within one OFDM symbol.

The range for the sum to be obtained is within a period of one OFDM symbol, and the variation rate per carrier when only the variation in the transfer function on the frequency axis is detected is represented by Equation (3).

Where an average value is Have, and a transfer function at time t and at a frequency f is H(f, t), $$fvar = 1/N \sum_{0}^{N-1} |H(f, t) - Have| \quad (3)$$

Here, it is assumed that a value normalized by a carrier count (=a sample count) N is referred to as "variation value fvar".

The variation value fvar in Equation (3) indicates the degree of rise or drop from the average per carrier (sample), that is, fvar indicates the degree of the strength of a reflected wave relative to a direct wave, which is the dominant wave (corresponding to the reciprocal ratio of the D/U ratio).

The variation detecting section 5 for fvar represented by Equation (3) includes: for example, an average value calculating unit configured to calculate the average value Have within a period of one symbol, from the transfer function H(f,t); a subtractor configured to subtract the average value Have from the transfer function H(f,t); an absolute value calculating unit configured to calculate a differential absolute value of an output of the subtractor; and an averaging unit configured to average N (N is a natural number) differential absolute values.

FIGS. 3A and 3B each illustrate an example of a method for detecting a variation value dfvar in the variation detecting section 5b. FIG. 3A illustrates the case of closely-spaced multipath in which a reflected wave has a short-time delay, and FIG. 3B illustrates the case of long-delay multipath in which a reflected wave has a long-time delay.

In this variation detection, an absolute value is obtained for the difference in the transfer function between adjacent carriers, and an average value for the differences in a symbol period is calculated.

$$dfvar = 1/N \sum_{0}^{N-1} |H(f, t) - H(f+1, t)| \quad (4)$$

The variation detecting section 5b for dfvar represented by Equation (4) includes: for example, a retaining unit configured to retain transfer functions H(f, t) and H(f+1, t) of two adjacent carriers; a subtractor configured to obtain the difference between these two transfer functions H(f, t) and H(f+1, t); an absolute value calculating unit configured to calculate a differential absolute value of an output of the subtractor; and an averaging unit configured to average N (N is a natural number) differential absolute values.

The difference in the frequency intervals formed by frequency variation between FIGS. 3A and 3B is based on the difference in delay time arising from the multipath delay. Where the time of delay of the reflected wave relative to the direct wave is, for example, $\tau$, in FIG. 3A, this time interval is expressed as a spectrum having a cycle of a frequency of $1/\tau$ on the frequency axis. Similarly, where the time of delay of the reflected wave relative to the direct wave is, for example, $3\tau$, in FIG. 3B, this interval is expressed as a spectrum having a cycle of a frequency of $1/3\tau$ on the frequency axis. In other words, in FIG. 3B, a spectrum having a frequency interval that is one-third of that in FIG. 3A.

When the differences in transfer function between adjacent carriers for each of the closely-spaced multipath illustrated in FIG. 3A and the long-delay multipath illustrated in FIG. 3B are calculated based on the above, in the long-delay multipath in FIG. 3B, a large differential value is obtained between the carriers, and thus, fast frequency variation, that is, long delay time can be estimated.

When fvar is calculated based on the differences from the average value using Equation (3) for each of the cases of FIGS. 3A and 3B, the variation values fvar in FIGS. 3A and 3B are almost equal to each other, while when dfvar is calculated based on the differences between adjacent carriers using Equation (4), dfvar has a small value in FIG. 3A while having a large value in FIG. 3B.

In other words, the result of calculating the variation value fvar from the differences from the average value like that illustrated in FIG. 2, the difference in delay time length like that between FIGS. 3A and 3B can hardly be distinguished; however, with the results of calculating dfvar illustrated in FIGS. 3A and 3B, the difference in delay time length can be distinguished.

Figure 5:
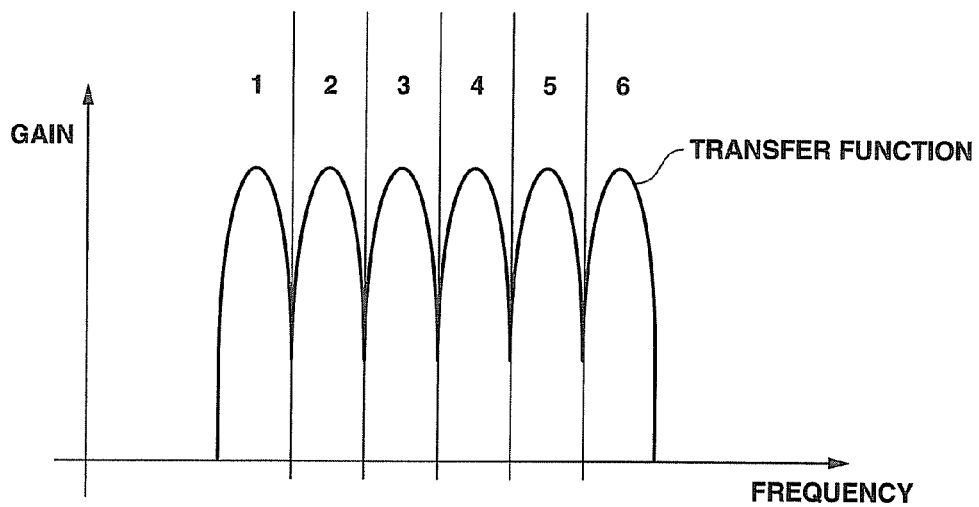
FIG. 5 is an explanatory diagram illustrating a still further example of a method for detection in a variation detecting section.

While the above-described variation detection is directed to calculation of fvar and dfvar illustrated in FIGS. 2, 3A and 3B as variation values, another variation detection method will be described below with reference to FIGS. 4 and 5. FIGS. 4 and 5 each illustrate variation of a transfer function on the frequency axis.

FIG. 4 illustrates an example of a method for detecting variation, which is different from fvar, in the variation detecting section 5. This example corresponds to, so to speak, a simplified version of fvar.

By means of detecting a maximum value and a minimum value and detecting the peak difference between the maximum value and the minimum value as illustrated in FIG. 4, variation similar to fvar can be detected. Consequently, the D/U ratio of the multipath can be calculated. The method in FIG. 4 provides an advantage in that variation similar to fvar in FIG. 2 can be detected without obtaining the difference from an average value for each carrier as in FIG. 2.

FIG. 5 illustrates an example of a method for detecting variation, which is different from dfvar, in the variation detecting section 5b. This is, so to speak, a simplified version of dfvar.

By means of measuring the number of increases and decreases as illustrated in FIG. 5, the delay of the multipath can be determined. Consequently, variation similar to dfvar can be detected. Measuring the number of drops and rises of the transfer function due to multipath interference, where the number n is large, the variation cycle $1/n\tau$ is small, which means that the delay time of the multipath (reflected wave) is large, while the number n is small, which means the delay time of the multipath is small. The method in FIG. 5 provides an advantage in that variation similar to dfvar in FIG. 3 can be detected without obtaining the differences between adjacent carriers as opposed to FIG. 3.

Although, for the variation detection according to the above-described embodiment, a combination of the method illustrated in FIG. 2 and the method illustrated in FIG. 3 has been described, a combination of other different methods can also perform similar variation detection. For example, a combination of the method in FIG. 2 and the method in FIG. 5 or a combination of the method in FIG. 3 and the method in FIG. 4 may be employed. Alternatively, a combination of the method in FIG. 4 and the method in FIG. 5 may be employed. Furthermore, a combination of at least one of the methods in FIGS. 2 to 5 and a variation detection method other than these methods may be employed.

Figure 6:
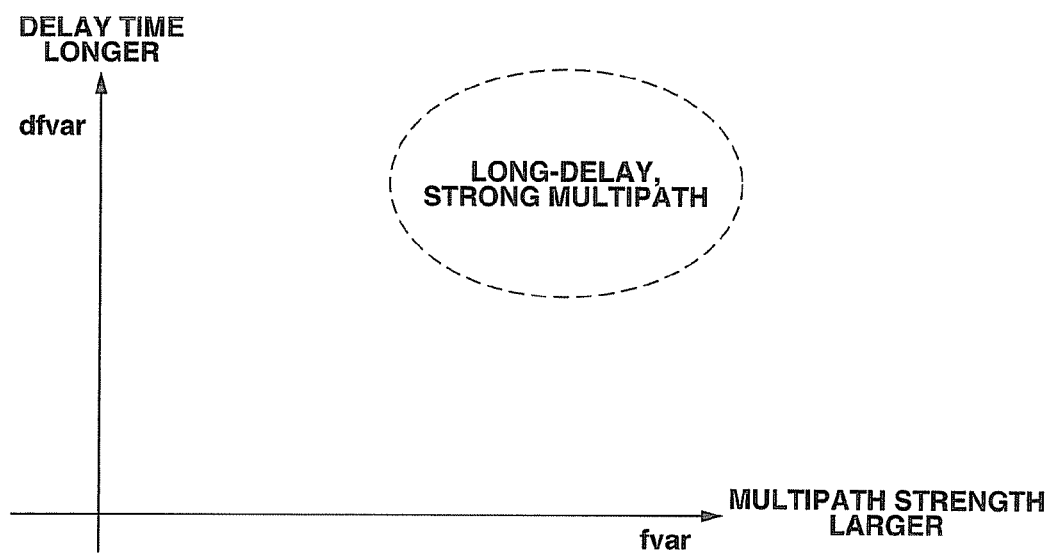
FIG. 6 is an explanatory diagram illustrating a two-dimensional multipath determination method using fvar and dfar.

FIG. 6 illustrates two-dimensional determination being made using a plurality of different variation detection methods in the variation detecting sections 5 and 5b in the above-described embodiment.

Two parameters, i.e., fvar, which indicates multipath strength, and dfvar, which indicates multipath delay time length, are two-dimensionally arranged on the x and y axes, and a current specific region in the multipath characteristic domain is found in a multipath reception environment, enabling improvement of the current reception performance.

In other words, the two-dimensional arrangement of fvar and dfvar in FIG. 6 enables a determination that cannot be made with a one-dimensional arrangement of fvar only. For example, the region surrounded by the dashed line in FIG. 6 indicates the state in which the multipath is strong and has a long delay, and if it is known that dedicated tuning for the status (special tune setting) provides the best reception performance, the dedicated tuning is performed as special processing. In other words, if it turns out that the current reception state is in the region surrounded by the dashed line (the region in which the values fvar and dfvar are both high) based on both of the values fvar and dfvar, a performance improvement measure corresponding to this dashed line region (for example, the aforementioned dedicated tuning) is performed to improve the performance.

Where the delay time of the multipath varies, the fvar value depends on the D/U, but is hardly affected by the delay time. Meanwhile, the dfvar value becomes larger as the delay time is longer. Consequently, determination of the delay time can be made.

For example, the region illustrated in FIG. 6 indicates a multipath with a low D/U and a long delay.

In this way, use of a plurality of variation detection methods enables not only one-dimensional determination, but also determination in a two-dimensional space, enabling determination that has not conventionally been provided. In this example, determination that the multipath is a long-delay, strong multipath can be made.

Furthermore, for the two-dimensional result, a function not only providing two values only, but also having a gradient allowing provision of multiple values can be employed in the area indicted by the region and another area.

Furthermore, although the present embodiment has employed a two-dimensional example for simplification, more complex region determination can be made, and the present invention can also be employed in determination in a three or more-dimensional, i.e., n-dimensional space.

The frequency division multiplex transmission signal receiving apparatus according to the present invention is not limited to being used in orthogonal frequency division multiplexing (OFDM), and can also be used in other different digital transmission systems such as spread spectrum communication system.

Having described the embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A frequency division multiplex transmission signal receiving apparatus for receiving a frequency division multiplex transmission signal using a plurality of carriers, the apparatus comprising:
an estimation section configured to estimate a transfer function of a received signal after the received signal has been transformed into a frequency domain signal;
a demodulation section configured to demodulate the received signal according to the transfer function estimated by the estimation section;
a plurality of variation detecting sections configured to perform variation detection using a plurality of different variation detection methods, based on the transfer function estimated by the estimation section;
a reliability determining section configured to determine reliability based on a result of a combination of variation detection results of the plurality of variation detecting sections; and
a correction section configured to perform error correction of the demodulated signal from the demodulation section, the modulated signal being subjected to an application of a reliability determination result of the reliability determining section.

2. The frequency division multiplex transmission signal receiving apparatus according to claim 1,
wherein one of the plurality of variation detecting sections detects an amount of difference from an average value on a frequency axis for the transfer function estimated by the estimation section.

3. The frequency division multiplex transmission signal receiving apparatus according to claim 1,
wherein one of the plurality of variation detecting sections detects an amount of difference between adjacent values on a frequency axis of the transfer function estimated by the estimation section.

4. The frequency division multiplex transmission signal receiving apparatus according to claim 1,
wherein one of the plurality of variation detecting sections detects an amount of difference between a maximum value and a minimum value on a frequency axis of the transfer function estimated by the estimation section.

5. The frequency division multiplex transmission signal receiving apparatus according to claim 1,
wherein one of the plurality of variation detecting sections detects the number of increase and decrease variations on a frequency axis of the transfer function estimated by the estimation section.

6. The frequency division multiplex transmission signal receiving apparatus according to claim 1,
wherein the plurality of variation detecting sections include:
a first variation detecting section configured to detect an amount of difference from an average value on a frequency axis for the transfer function estimated by the estimation section; and
a second variation detecting section configured to detect an amount of difference between adjacent values on a frequency axis of the transfer function estimated by the estimation section.

7. The frequency division multiplex transmission signal receiving apparatus according to claim 1,
wherein the plurality of variation detecting sections include:
a third variation detecting section configured to detect an amount of difference between a maximum value and a minimum value on a frequency axis of the transfer function estimated by the estimation section; and
a fourth variation detecting section configured to detect the number of increase and decrease variations on a frequency axis of the transfer function estimated by the estimation section.

8. The frequency division multiplex transmission signal receiving apparatus according to claim 1,
wherein the plurality of variation detecting sections include:
a first variation detecting section configured to detect an amount of difference from an average value on a frequency axis for the transfer function estimated by the estimation section; and a fourth variation detecting section configured to detect the number of increase and decrease variations on a frequency axis of the transfer function estimated by the estimation section.

9. The frequency division multiplex transmission signal receiving apparatus according to claim 1,
wherein the plurality of variation detecting sections include:
a second variation detecting section configured to detect an amount of difference between adjacent values on a frequency axis of the transfer function estimated by the estimation section; and
a third variation detecting section configured to detect an amount of difference between a maximum value and a minimum value on a frequency axis of the transfer function estimated by the estimation section.

10. The frequency division multiplex transmission signal receiving apparatus according to claim 1,
wherein the plurality of variation detecting sections include a first variation detecting section and a second variation detecting section; and
a first output of the first variation detecting section and a second output of the second variation detecting section are two-dimensionally arranged on a horizontal axis and a vertical axis, respectively, and in which region in the two-dimensional space a current reception state resides is determined based on the first and second outputs, enabling performance improvement corresponding to the region.

11. The frequency division multiplex transmission signal receiving apparatus according to claim 2,
wherein the variation detecting section includes:
an average value calculating unit configured to calculate an average value within a period of one symbol from the transfer function estimated by the estimation section;
a subtractor configured to subtract the average value from the transfer function estimated by the estimation section;
an absolute value calculating unit configured to calculate a differential absolute value of an output of the subtractor; and
an averaging unit configured to average N (N is a natural number) differential absolute values.

12. The frequency division multiplex transmission signal receiving apparatus according to claim 3,
wherein the variation detecting section includes:
a retaining unit configured to retain transfer functions of two adjacent carriers, the transfer functions being estimated by the estimation section;
a subtractor configured to obtain a difference between the two transfer functions;
an absolute value calculating unit configured to calculate a differential absolute value of an output of the subtractor; and
an averaging unit configured to average N (N is an natural number) differential absolute values.

\* \* \* \* \*